United States Patent
Sollami et al.

(10) Patent No.: US 11,250,572 B2
(45) Date of Patent: Feb. 15, 2022

(54) SYSTEMS AND METHODS OF GENERATING PHOTOREALISTIC GARMENT TRANSFERENCE IN IMAGES

(71) Applicant: salesforce.com, inc., San Francisco, CA (US)

(72) Inventors: Michael Sollami, Cambridge, MA (US); Amir Hossein Raffiee, Cambridge, MA (US)

(73) Assignee: salesforce.com, inc., San Francisco, CA (US)

( * ) Notice: Subject to any disclaimer, the term of this patent is extended or adjusted under 35 U.S.C. 154(b) by 269 days.

(21) Appl. No.: 16/658,206

(22) Filed: Oct. 21, 2019

(65) Prior Publication Data

US 2021/0118149 A1   Apr. 22, 2021

(51) Int. Cl.
| | |
|---|---|
| *G06T 7/174* | (2017.01) |
| *G06Q 30/06* | (2012.01) |
| *G06K 9/00* | (2022.01) |
| *G06N 3/08* | (2006.01) |
| *G06T 7/11* | (2017.01) |

(52) U.S. Cl.
CPC .......... *G06T 7/174* (2017.01); *G06K 9/00369* (2013.01); *G06N 3/084* (2013.01); *G06Q 30/0643* (2013.01); *G06T 7/11* (2017.01)

(58) Field of Classification Search
CPC . G06T 7/174; G06T 7/11; G06T 2207/30196; G06T 2207/20164; G06T 2200/28; G06T 2207/20081; G06T 2207/20084; G06T 5/005; G06T 5/50; G06Q 30/0643; G06K 9/00369; G06K 9/34; G06K 9/6257; G06K 9/00362; G06N 3/084
See application file for complete search history.

(56) References Cited

U.S. PATENT DOCUMENTS

| | | | | |
|---|---|---|---|---|
| 10,475,099 | B1 * | 11/2019 | Nomula | G06F 16/951 |
| 10,540,757 | B1 * | 1/2020 | Bouhnik | G06K 9/00671 |
| 10,664,903 | B1 * | 5/2020 | Haitani | H04W 88/02 |
| 10,885,708 | B2 * | 1/2021 | Guay | G06T 7/75 |
| 10,909,744 | B1 * | 2/2021 | Stuyck | G06F 30/27 |

(Continued)

OTHER PUBLICATIONS

Han et al., "VITON: An Image-based Virtual Try-on Network," arXiv:1711.08447v4 [cs.CV] Jun. 12, 2018.*

*Primary Examiner* — Xuemei G Chen
(74) *Attorney, Agent, or Firm* — Butzel Long

(57) ABSTRACT

Systems and methods are provided for determining a first semantic segmentation image of a first image, wherein the first image includes at least a portion of a person wearing a first fashion item. A plurality of keypoints of the person's body may be determined in the first image. Using the determined first semantic segmentation image, the determined keypoints, and a second image that includes a second fashion item, a second semantic segmentation image of the person in the first image with the second fashion item of the second image may be generated. The first image may be masked to occlude pixels of the first fashion item that is to be replaced with the second fashion item. Using the masked first image, the second semantic segmentation image, and the second image that includes the second fashion item, a third image may be generated that includes the person with the second fashion item.

24 Claims, 11 Drawing Sheets

(56) References Cited

U.S. PATENT DOCUMENTS

| | | | |
|---|---|---|---|
| 11,017,261 B1* | 5/2021 | Zheng | G06K 9/6267 |
| 11,030,807 B2* | 6/2021 | Watts | G06T 11/00 |
| 11,069,150 B2* | 7/2021 | Sminchisescu | G06T 7/11 |
| 11,080,918 B2* | 8/2021 | Chen | G06F 16/5838 |
| 11,158,121 B1* | 10/2021 | Tung | G06F 17/18 |
| 2011/0246329 A1* | 10/2011 | Geisner | G06F 3/017 |
| | | | 705/27.1 |
| 2014/0176565 A1* | 6/2014 | Adeyoola | G06F 16/5854 |
| | | | 345/473 |
| 2015/0154453 A1* | 6/2015 | Wilf | G06K 9/46 |
| | | | 382/103 |
| 2016/0267576 A1* | 9/2016 | Crossman Sullivan | |
| | | | G06Q 30/0601 |
| 2016/0284017 A1* | 9/2016 | Almog | G06Q 30/0643 |
| 2017/0018024 A1* | 1/2017 | Xu | G06Q 30/0643 |
| 2017/0278135 A1* | 9/2017 | Majumdar | G06K 9/00362 |
| 2017/0352091 A1* | 12/2017 | Chen | G06F 3/0482 |
| 2017/0352092 A1* | 12/2017 | Mitchell | G06T 15/503 |
| 2018/0047192 A1* | 2/2018 | Kristal | G06Q 30/0643 |
| 2019/0026954 A1* | 1/2019 | Vats | G06T 11/001 |
| 2019/0043269 A1* | 2/2019 | Lin | G06T 17/00 |
| 2019/0050427 A1* | 2/2019 | Wiesel | G06K 9/3241 |
| 2019/0244407 A1* | 8/2019 | Wiesel | G06K 9/00369 |
| 2020/0066029 A1* | 2/2020 | Chen | G06T 15/04 |
| 2020/0151503 A1* | 5/2020 | Wang | G06K 9/325 |
| 2020/0233239 A1* | 7/2020 | Schwarz | G02C 13/003 |
| 2020/0285888 A1* | 9/2020 | Borar | G06K 9/6255 |
| 2020/0302168 A1* | 9/2020 | Vo | G07F 17/3206 |
| 2020/0306640 A1* | 10/2020 | Kolen | A63F 13/63 |
| 2020/0342646 A1* | 10/2020 | Wang | G06T 13/205 |
| 2020/0380594 A1* | 12/2020 | Ueda | H04N 7/18 |
| 2020/0394704 A1* | 12/2020 | Brocwell | G06Q 30/0643 |
| 2020/0402307 A1* | 12/2020 | Tanwer | G06Q 30/0201 |
| 2021/0026521 A1* | 1/2021 | Lee | G06T 19/20 |
| 2021/0049811 A1* | 2/2021 | Fedyukov | G06T 7/50 |
| 2021/0055801 A1* | 2/2021 | Lee | G06F 3/005 |
| 2021/0065418 A1* | 3/2021 | Han | G06T 7/11 |
| 2021/0090209 A1* | 3/2021 | Appleboim | G06T 19/006 |
| 2021/0097715 A1* | 4/2021 | Li | G06T 15/205 |

* cited by examiner

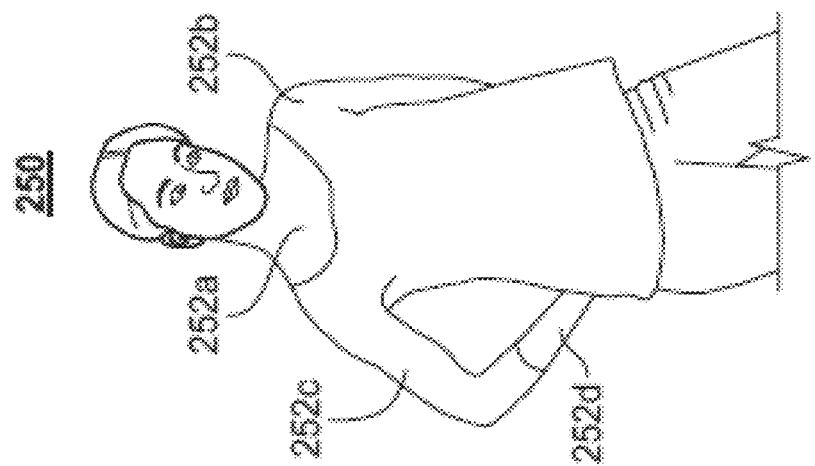
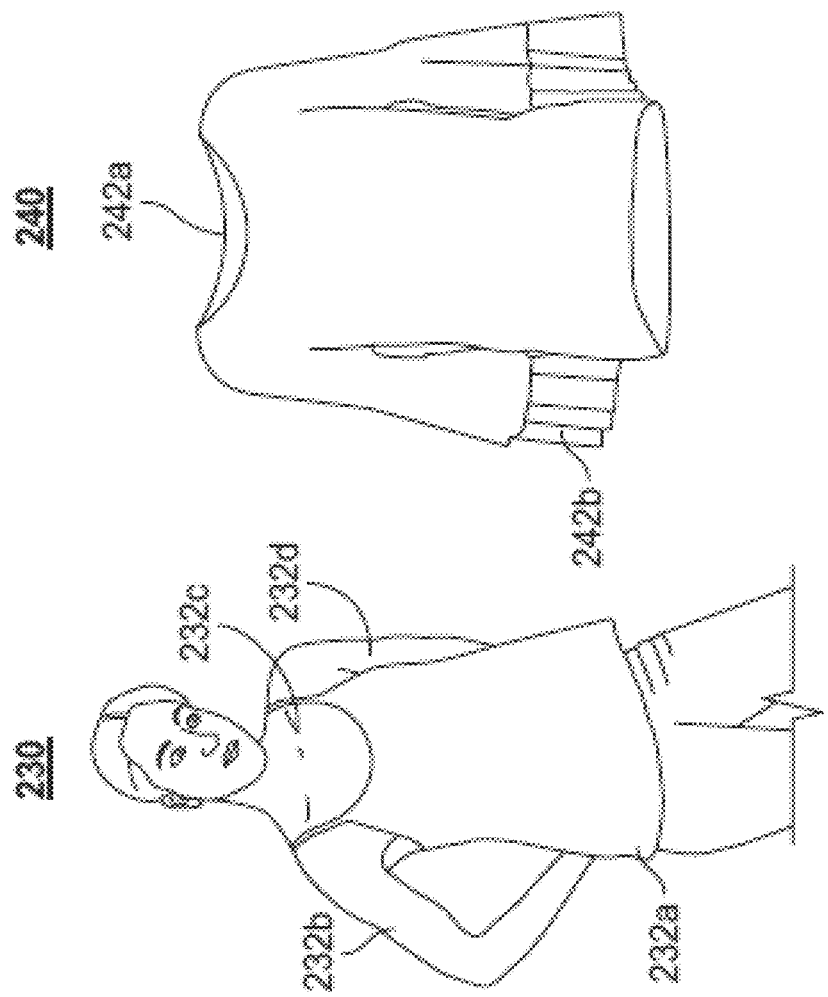
FIG. 2B

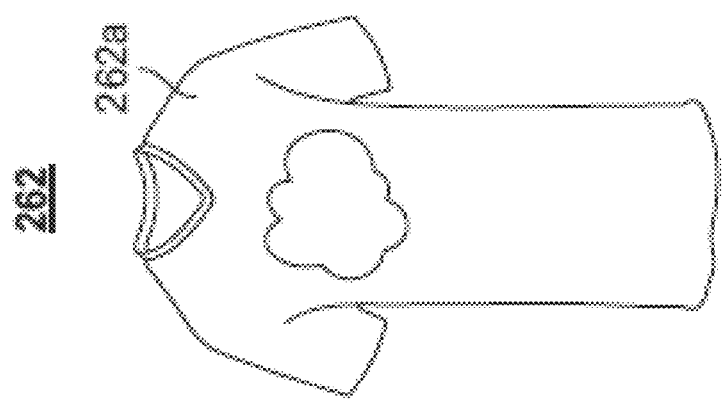
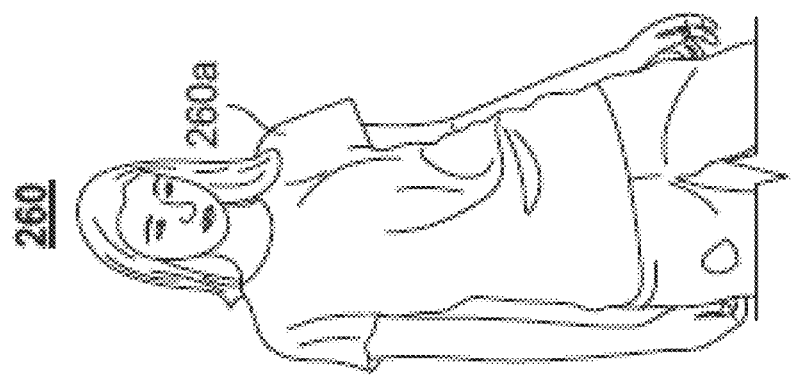
FIG. 2C

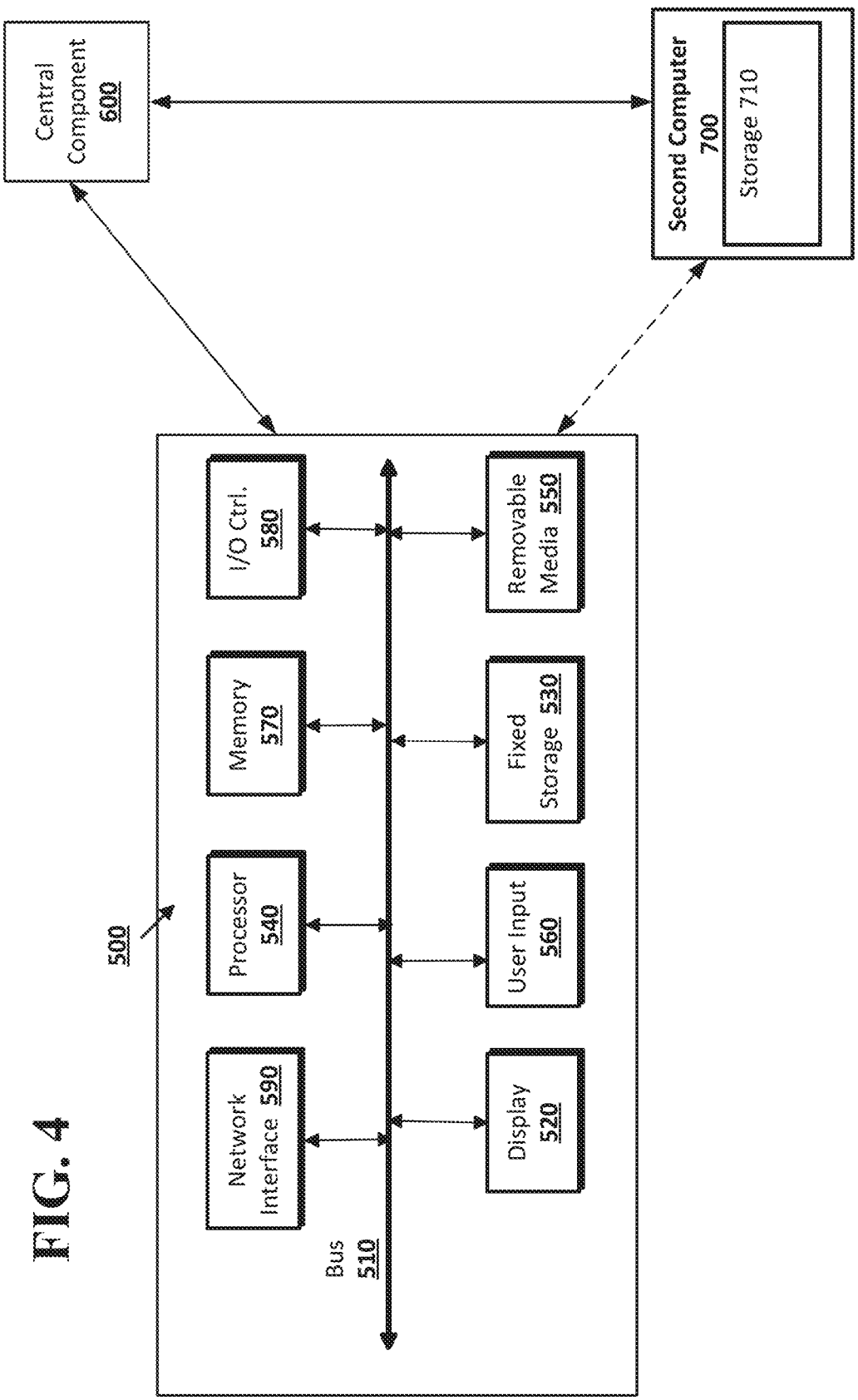

SYSTEMS AND METHODS OF GENERATING PHOTOREALISTIC GARMENT TRANSFERENCE IN IMAGES

BACKGROUND

Presently, methods of garment transference in images use 3D (three-dimensional) information of a body of a person in order to fit the image of a fashion item onto an image of the body. Current methods that only rely on two-dimensional information cannot fit apparel with photorealism at high resolution.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIGS. 2A-2D shows examples of determining key points on an image of a person, masking the image, and transferring an image of a fashion item onto the image of the person according to implementations of the disclosed subject matter.

FIG. 4 shows a computer system according to an implementation of the disclosed subject matter.

DETAILED DESCRIPTION

Figure 1A:
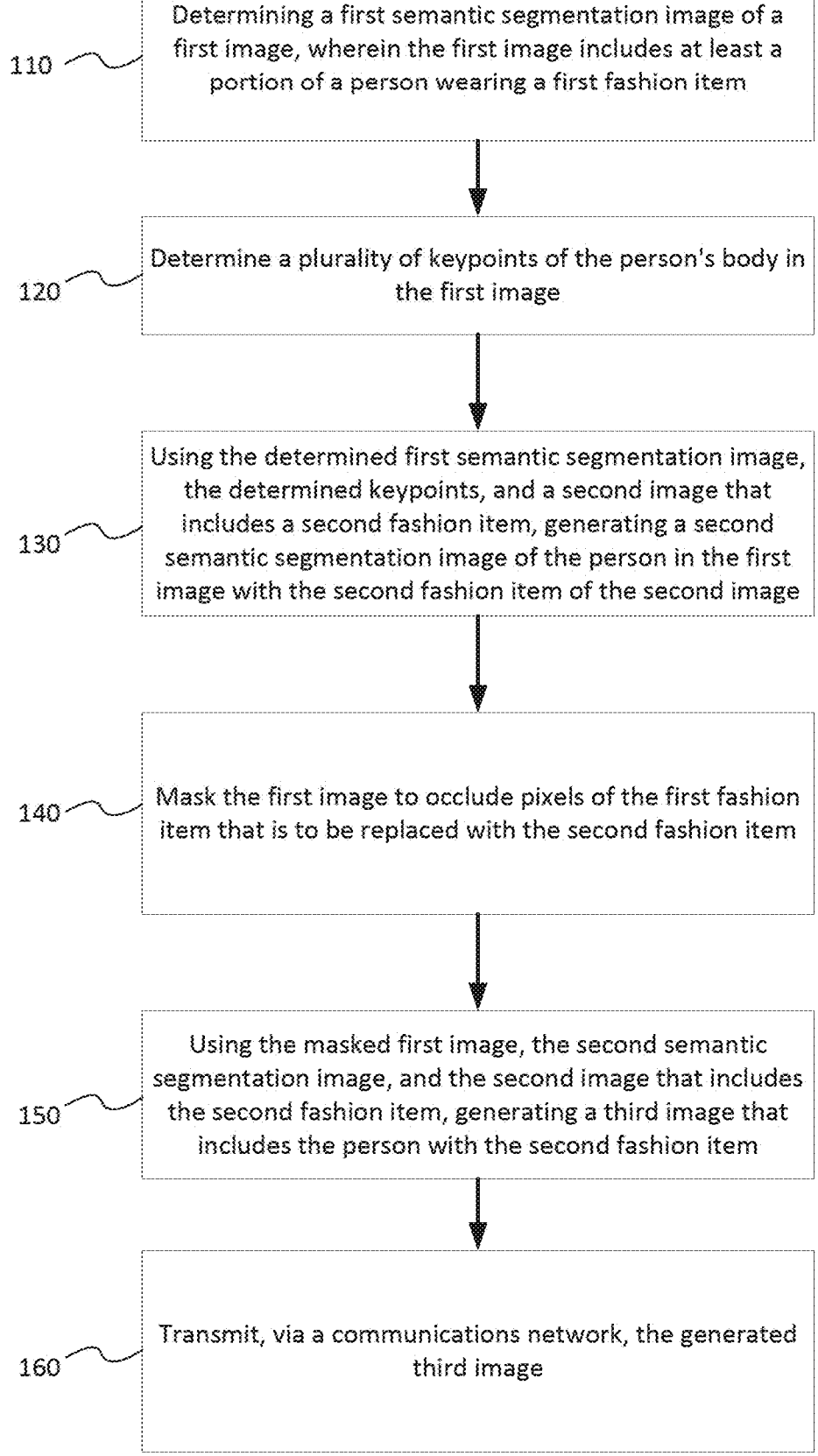
FIG. 1A shows an example method of transferring an image of a fashion item onto an image of a person according to implementations of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Implementations of the disclosed subject matter provide systems and methods of generating an image so that a customer can determine how a fashion item of interest may look on the customer. Systems and methods of the inventive concept use two images: (1) a picture of the target fashion item, and (2) an image including the customer. The generated output image includes the customer wearing the target fashion item. The two images may be used to generate a realistic-appearing image of the person with the fashion item, and there does not have to be specific training of the system to generate the image of the fashion item on the image of the person.

Implementations of the disclosed subject matter determine the semantic segmentation of the pixels of the customer's image, and determine keypoints of a customer's body. A new segmentation image of the customer wearing the apparel may be generated using the semantic segmentation, the keypoints, and a fashion item image. The image of the customer may be masked to occlude pixels of the garment to be replaced. To generate the segmentation map for poses that may introduce occlusions (e.g., where one or more locations of hands, arms, legs, feet, or the like which may introduce occlusions, such as by crossing), the pixels of the occluded portions of the person may be located using keypoint information. For example, the pixels of an identified hand may be retained in the input segmentation map (i.e., the hand is not masked) to generate a segmentation map that addresses occluding poses. A final image may be generated using the masked image, the generated semantic segmentation, the computed keypoints of the body, and the original fashion item image. A final image may be generated using the masked image, the generated semantic segmentation, and the original fashion item image. Losses between the generated semantic segmentation of the customer wearing the fashion item and the originally-generated semantic segmentation image may be determined using cross-entropy loss and adversarial loss, and the system may be trained using convolution back-propagation. In some implementations, the image of the customer may be masked to occlude pixels of the garment that are being replaced by using the semantic segmentation, the masked image, and the fashion item image to synthesize a new image of the customer wearing the target apparel. Synthesizing the new image may include using the body keypoints to manipulate the image of the fashion item to match the body of the person. The manipulation may include adjusting the orientation, lighting, skin, background conditions, and the like. Losses may be determined by a combination of perceptual loss, feature matching loss, and adversarial loss. The system may be trained by back-propagating the error gradient toward the parameters.

Present systems and methods require obtaining 3D information and computing depth maps, which is costly in terms of time and computational resources. Although there are current methods that rely on 2D (two dimensional) information, these current methods cannot fit apparel with photorealism at high resolution in certain poses. That is, existing systems and methods are unable to maintain the fidelity of pixel-level details in the apparel (e.g., texture, patterns, and the like) when transferred. In contrast, implementations of the disclosed subject matter may provide a photorealistic image without training a system with a large dataset, which may be both time intensive and computational resource intensive.

FIG. 1A shows an example method 100 of transferring an image of a fashion item onto an image of a person according to implementations of the disclosed subject matter. A server (e.g., central component 600 and/or second computer 700 shown in FIG. 4, and/or databases system databases 1200a-

Figure 5:
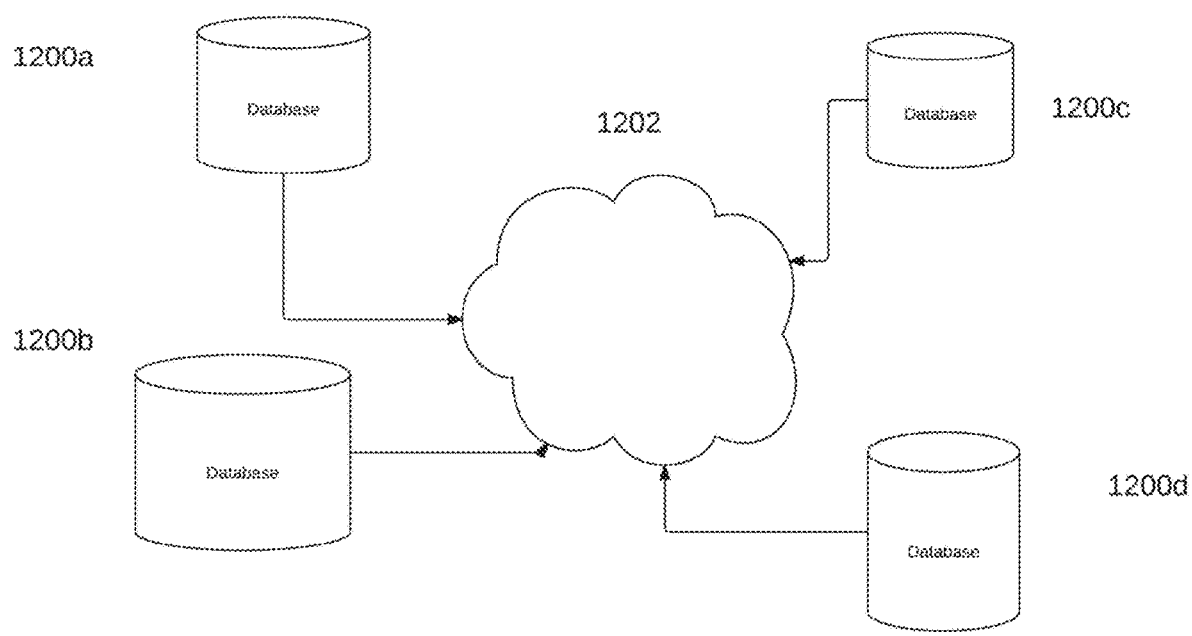
FIG. 5 shows a network configuration according to an implementation of the disclosed subject matter.

1200*d* shown in FIG. 5) may receive a first image that includes at least a portion of a person wearing a first fashion item (e.g., shirt, pants, dress, belt, shoes, jewelry, hat, scarf, garment, and/or fashion accessory). In some implementations, the first image may be received by the server from a camera, a computer, and/or mobile device (e.g., computer 500 shown in FIG. 4) that may capture and/or store the first image and/or may be retrieved from a storage device (e.g., storage 710 shown in FIG. 4 and/or databases system databases 1200*a*-1200*d* shown in FIG. 5). Examples of the first image may include at least a portion of a person wearing a first fashion item are shown in image 200 of FIG. 2A, image 230 of FIG. 2B, image 260 of FIG. 2C, and/or image 270 of FIG. 2D.

At operation 110, a first semantic segmentation image of the first image may be determined by the server. The semantic segmentation may partition the image into coherent parts, such as which part of the image include garments, fashion accessories, body parts of the person, background, or the like. The server performing the semantic segmentation of the image may be part of a generative adversarial network (GAN). In implementations of the disclosed subject matter, the GAN may use an image that includes a person (i.e., the first image including a person wearing a first fashion item) and an image of a fashion item (i.e., a second image that includes a second fashion item, as described below) to generate a new image with the person wearing the fashion item (i.e., the second fashion item). In some implementations, more than one image of a person may be provided to the server. For example, a plurality of images may be provided where the person is in a different pose, or the images are taken from different points of view (e.g., front view, side view, back view, and the like of the person), and/or the person may have any desired pose. The first semantic segmentation of the first image may retain the details of the one or more garments and/or fashion items in the image (e.g., color, cloth, texture, and the like).

At operation, 120, the server may determine a plurality of keypoints of the person's body in the first image. For example, image 210 shown in FIG. 2A includes keypoints 212*a*-212*m* that may be determined from the semantic segmentation of the image 200. The keypoints may be used to determine the pose of the person in the first image, and/or may be used to determine the shape of a fashion item (i.e., from the second image) that is to be disposed on the person in the first image. For example, the keypoints may be disposed on the shoulder, wrist, leg, arm, elbow, knee, ankle, and/or on any other body part or portion of the body of the person.

Using the determined first semantic segmentation image, the determined keypoints, and a second image that includes a second fashion item, a second semantic segmentation image may be generated at the server at operation 130. In contrast to the first semantic segmentation which may form an image that appears to be non-realistic with the person and the second fashion item, the second semantic segmentation may be used to form an image that appears photorealistic with the person and the second fashion item. The second semantic segmentation image may include the person in the first image with the second fashion item of the second image. For example, the second image that includes the second fashion item may be shown in image 240 of FIG. 2B, shirt 262*a* of image 262 of FIG. 2C, and image 280 in FIG. 2D. The second semantic segmentation image may be used to determine which portions of the first image to keep, and which portions may be replaced and/or fit with the second fashion item of the second image.

Figure 2A:
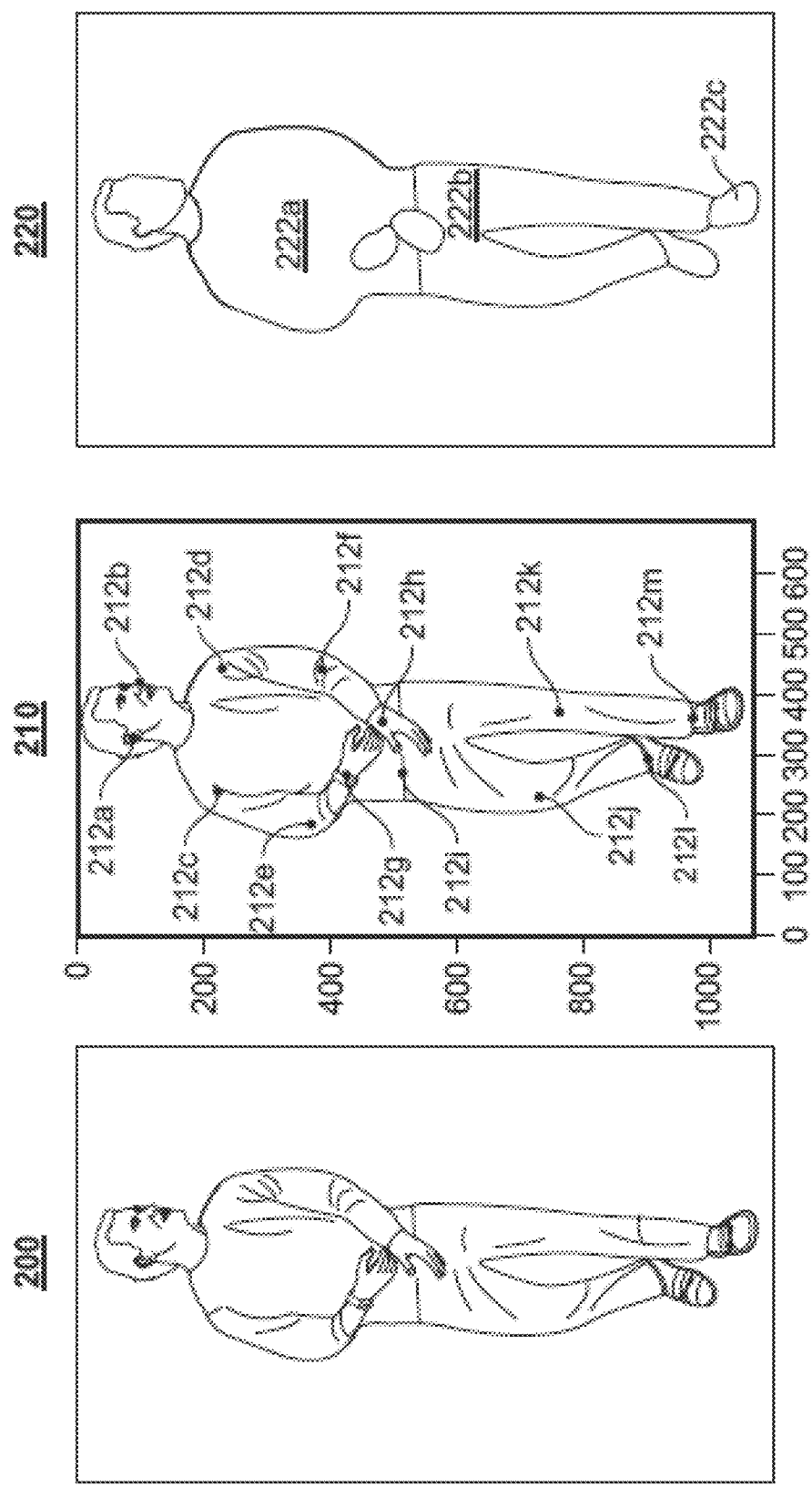
Figure 2D:
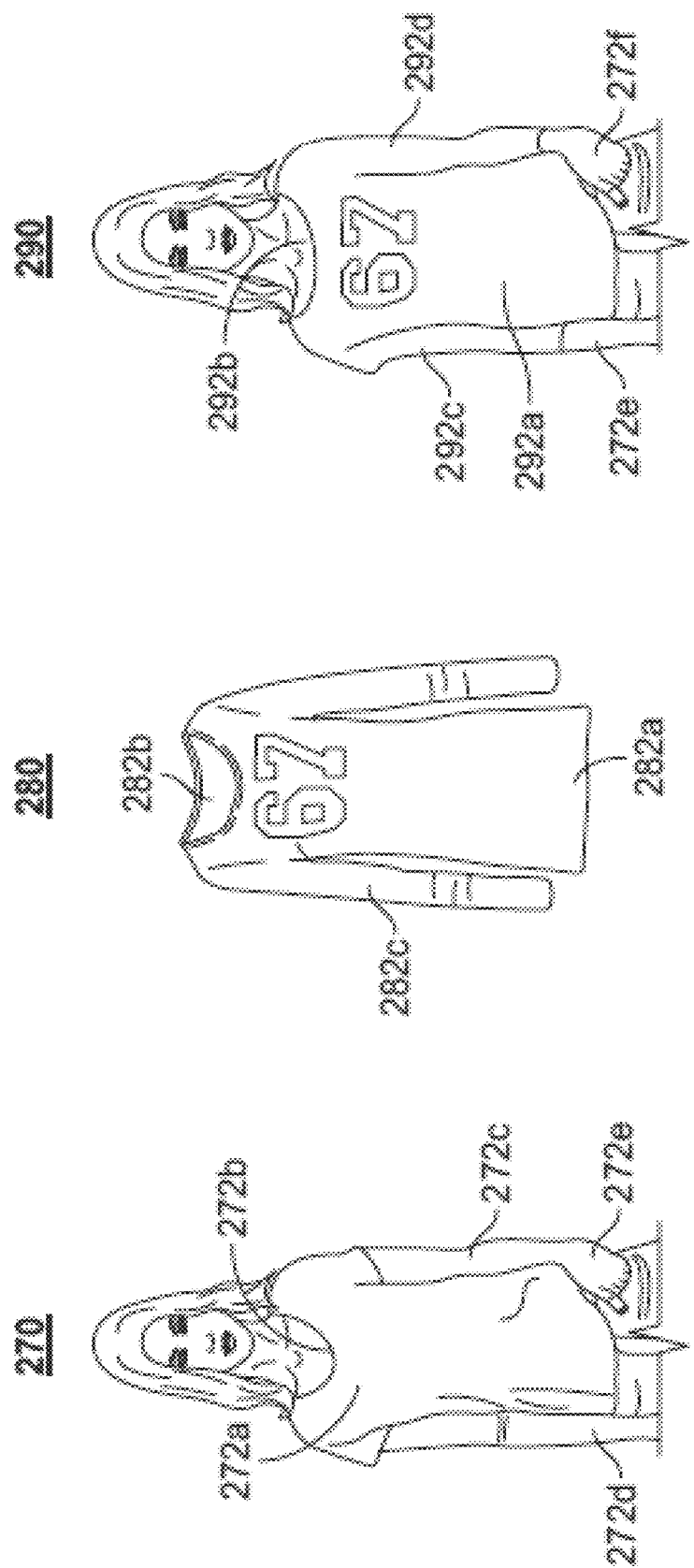

At operation 140, the server may mask the first image to occlude pixels of the first fashion item that is to be replaced with the second fashion item. Operation 140 may be used to determine which portions of the body of the person are not to be covered with the second fashion item (e.g., the hands, portions of the arms, portions of the neck, or the like). For example, image 220 of FIG. 2A shows masking of the image 200 so that the shirt 222*a*, pants 222*b*, and shoes 222*c* may be replaced with a fashion item. In another example, FIG. 2B shows the occlusion (e.g., shown in image 250) of the portions of a person (e.g., as shown in image 230) for the second fashion item (e.g., as shown in image 240). In image 230, fashion item 232*a* may be worn so that portions 232*b*, 232*c*, and 232*d* or the person are visible. When the second fashion item in image 240 having neckline 242*a* and sleeve length 242*b* replaces the first fashion item, the image of the person may be occluded as shown in image 250, where portions of the person 252*b* and 252*c* are covered, portion 252*d* remains visible, and where portion 252*a* is smaller than portion 232*c* of image 230. In some implementations, the masking of the first image to occlude pixels of the first fashion item may include deleting, at the server, minimal sub-images whose pixels are to be changed during the transference of the image of the second fashion item onto the image of the first fashion item on the person.

Figure 3A:
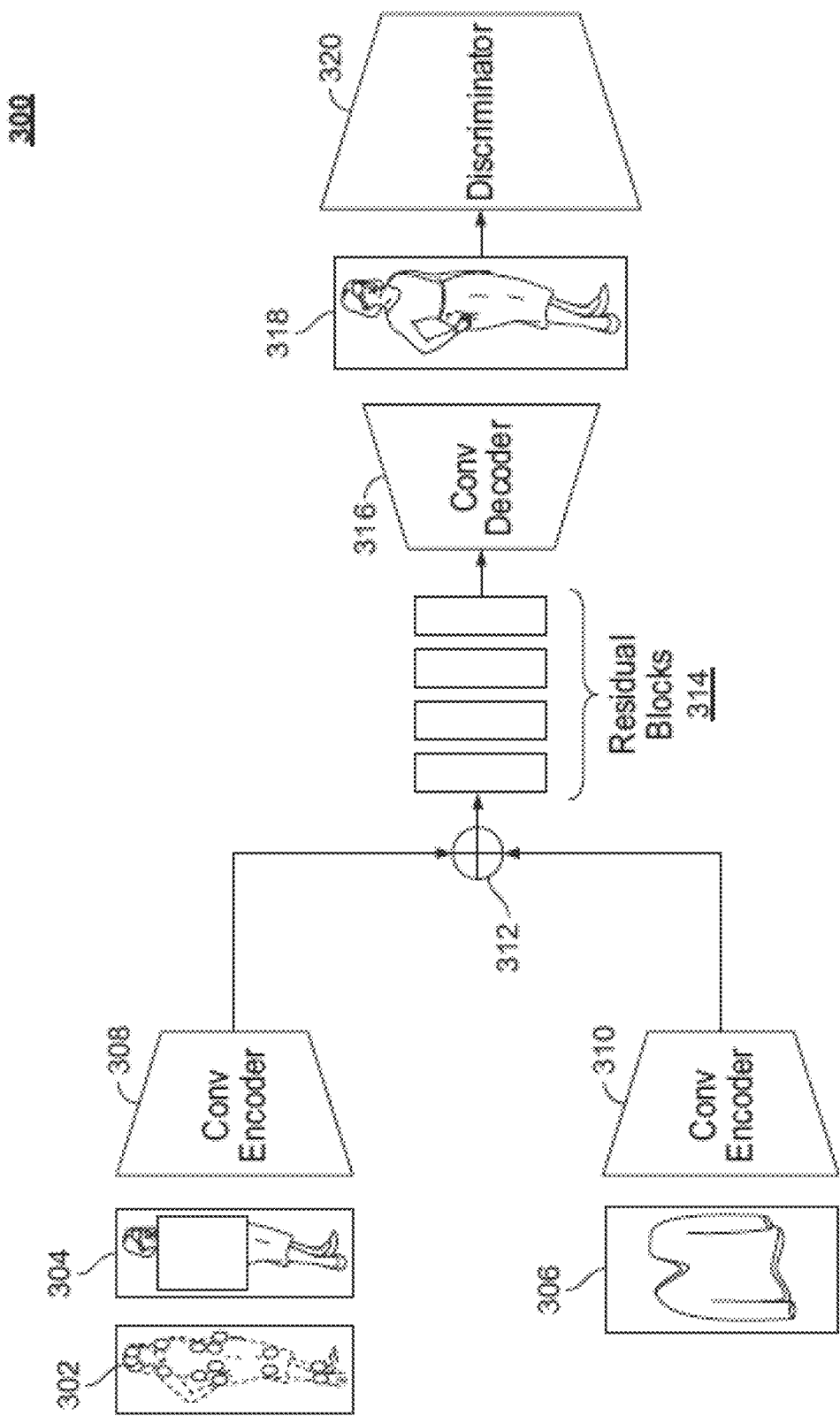
FIG. 3A shows a segmentation generative adversarial network (GAN) to predict pixel-wise semantic segmentation of an image of a person wearing the transferred fashion item according to an implementation of the disclosed subject matter.

The operations described above in connection with FIG. 1A may be generally shown in FIG. 3A, which include the segmentation generative adversarial network (GAN) 300 which may predict pixel-wise semantic segmentation of an image of the person wearing the transferred fashion item (i.e., the second fashion item from the second image) according to an implementation of the disclosed subject matter. The GAN 300 may be hardware, software, and/or any suitable combination thereof. The plurality of keypoints 302 of the person's body may be determined as described above. The first image may be masked at 304 to occlude pixels of the first fashion item to be replaced with the second fashion item as described above. The keypoints 302 and masking 304 may be convolved by using the convolution encoder 308 so as to concatenate the keypoints 302 and the masking 304, and generate the red, green, and blue (RGB) channels. Portion 306 of the GAN 300 may be the second image that includes the second fashion item, which may be convolved by the convolution encoder 310, which may generate the RGB channels of the second image.

The output from the convolution encoders 308 and 310 may be combined and/or concatenated at 312, and residual blocks 314 may be formed. The residual blocks 314 may include convolutional layers and residual information (e.g., batch normalization information, activation layer information, and the like) and may be used to regularize the training of the GAN 300. For example, the training may minimize the amount of vanishing gradients, overfitting, or the like. In some implementations, each of the residual blocks may have two connections from its input, with one going through a series of convolutions, batch normalization, and linear functions, and the other connection skipping over that series of convolutions and functions (e.g., identity, cross, or skip connections). The outputs of both connections may be added together. The convolution decoder 316 may decode the encoded residual blocks to form image 318 of the person wearing the transferred fashion item. The convolution decoder 316 may perform concatenation and matrix products to generate the image 318. In some implementations, an 8 channel binary output may be used to form a 256×256 image size, and/or any suitable output image size. The discriminator 320 may predict pixel-wise semantic segmentation of the image of the person wearing the transferred fashion item. In some implementations, the discriminator 320 may compare the image 318 with the first image and/or second image to determine whether the image 318 is comparatively realistic in order to train the GAN 300.

Using the masked first image, the second segmentation image, and the second image that includes the second fashion item, the server may generate a third image that includes the person with the second fashion item at operation 150 of FIG. 1A, and may transmit the generated third image (e.g., to computer 500 shown in FIG. 4) via a communications network at operation 160. The server may be part of the GAN, and the GAN may be used to generate the third image such that the second fashion item disposed on the person appears real. That is, the fashion item may have the desired positioning, texture, color, orientation, and the like on the person.

Figure 3B:
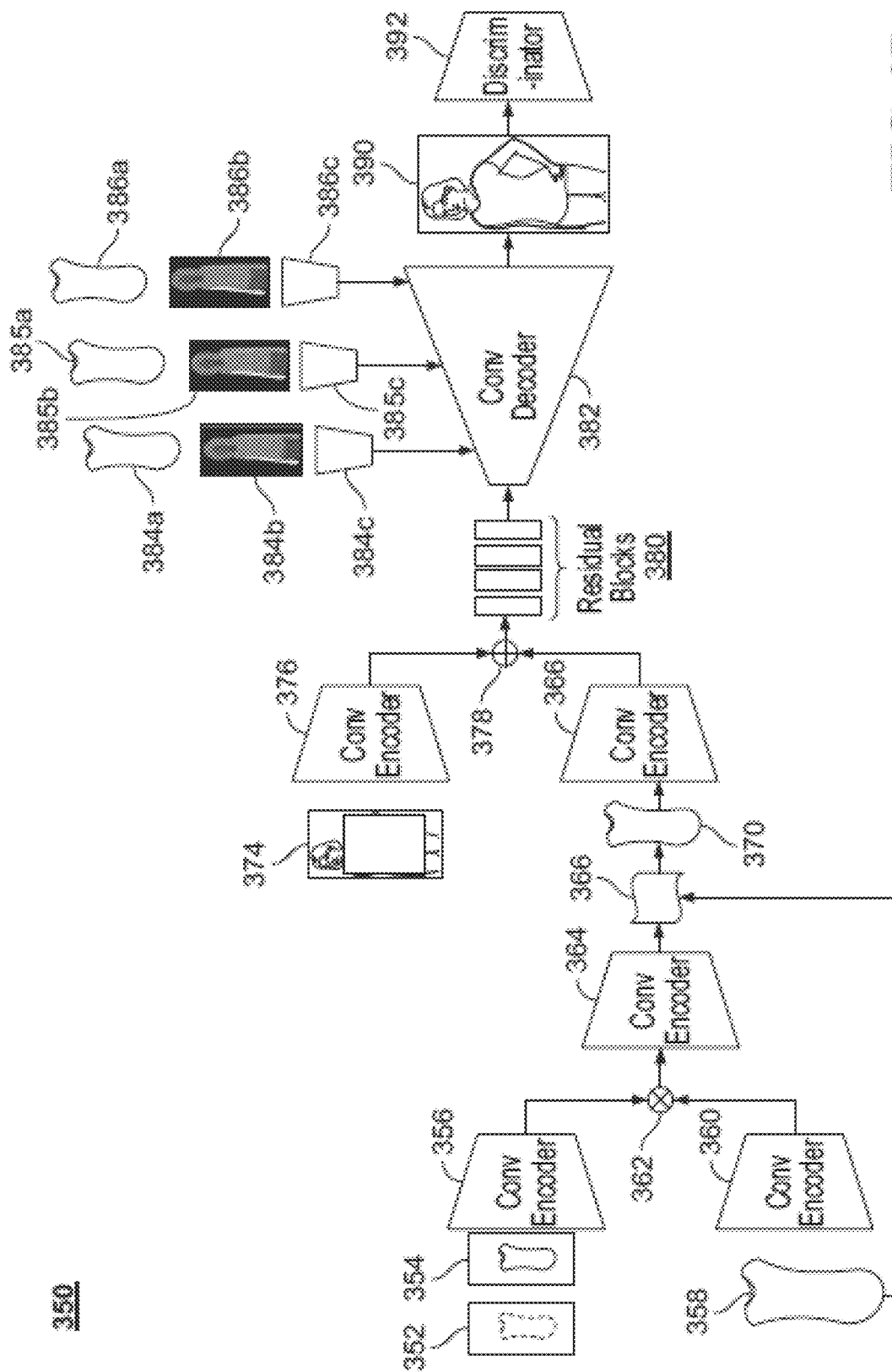
FIG. 3B shows an appearance GAN to generate a photorealistic image of the person wearing the transferred fashion item based on the segmentation GAN of FIG. 3A according to an implementation of the disclosed subject matter.

FIG. 3B shows an appearance GAN 350 to generate a photo-realistic image of the person wearing the transferred fashion item based on the segmentation GAN of FIG. 3A according to an implementation of the disclosed subject matter. The GAN 350 may be hardware, software, or any suitable combination thereof. The plurality of keypoints 352 of the person's body may be determined as described above. The first image may be masked at 354 to occlude pixels of the first fashion item to be replaced with the second fashion item as described above. The keypoints 352 and masking 354 may be convolved by using the convolution encoder 356 so as to concatenate the keypoints 352 and the masking 354, and generate the red, green, and blue (RGB) channels. Image 358 may be the second image that includes the second fashion item, which may be convolved by the convolution encoder 360, which may generate the RGB channels of the second image.

The output from the convolution encoders 356 and 360 may be combined at 362, and the combination may be convolved by convolution encoder 364. The image 358 and the output from convolution encoder 364 may be combined at 366 to form image 370, which may be convolved by convolution encoder 372. The image 358 may be used at 366 so as to better reproduce a final image with the image 358. The convolution encoder 372 may generate the RGB channels form the image 370.

Masked image 374 may be convolved by convolution encoder 376 so as to form RGB channels. The outputs of the convolution encoders 372 and 376 may be combined at 378, and residual blocks 380 may be formed. The residual blocks 380 may include convolutional layers and residual information (e.g., batch normalization information, activation layer information, and the like) and may be used to regularize the training of the GAN 350. For example, the training may minimize the amount of vanishing gradients, overfitting, or the like. In some implementations, each of the residual blocks may have two connections from its input, with one going through a series of convolutions, batch normalization, and linear functions, and the other connection skipping over that series of convolutions and functions (e.g., identity, cross, or skip connections). The outputs of both connections may be added together.

The convolution decoder 382 may decode the encoded residual blocks to form image 390, which may be a realistic image of the person wearing the transferred fashion item. The convolution decoder may use fashion item images 384a, 385a, and 386a, and corresponding masked images 384b, 385b, and 386b, which may be respectively encoded by convolution encoders 384c, 385b, and 385c to be output to the convolution decoder 382. That is, the images 384a, 384b, 385a, 385b, 386a, 386b may be subsamples (e.g., of the 8 channel binary output described above) and/or the output of the GAN 300 described above. The discriminator 392 may predict pixel-wise semantic segmentation of the image 390 of the person wearing the transferred fashion item. The discriminator 392 may compare the image 390 with the first image and/or second image to determine whether the image 390 is comparatively realistic in order to train the GAN 350.

The third image generated at operation 150 shown in FIG. 1A may be, for example, 256×256 pixels, or any other suitable size. If a larger image size is selected and/or desired for the third image, the server may increase the scale of the image. In some implementations, increasing the scale of the image may only increase the computational resources for method 100 linearly, rather than exponentially or any other non-linear increase.

The third image generated by operation 150, for example, may include the person with the second fashion item such as shown in image 264 of FIG. 2C. The shirt 260a being worn by the person in image 260 may be replaced by shirt 262a of image 262, so that the shirt (e.g., shirt 264a shown in image 264) has been fitted to the person. In this example, the first fashion item may be a t-shirt (e.g., shirt 262a) that is replaced by the second fashion item, which may be a different t-shirt (e.g., shirt 264a).

In another example, the second fashion item that is replacing the first fashion item may have different characteristics (e.g., sleeve length, neckline, pant length, or the like). In image 270 shown in FIG. 2D, shirt 272a (i.e., the first fashion item) may have neckline 272b (i.e., a v-neck), and portions 272c, 272d, and 272e of the person in image 270 may be exposed, as the shirt 272a is a t-shirt. The second fashion item, shown in image 280, may be a shirt 282a having neckline 282b (i.e., a scooped neck) and sleeves 282c (i.e., shirt 282a is a long-sleeved shirt). Operation 150 may generate image 290, which may show the person in the second fashion item (shirt 292a), having sleeved 292c and 292c that cover the arms of the person, and where portions 292b, 292e, and 292f are exposed.

Figure 1B:
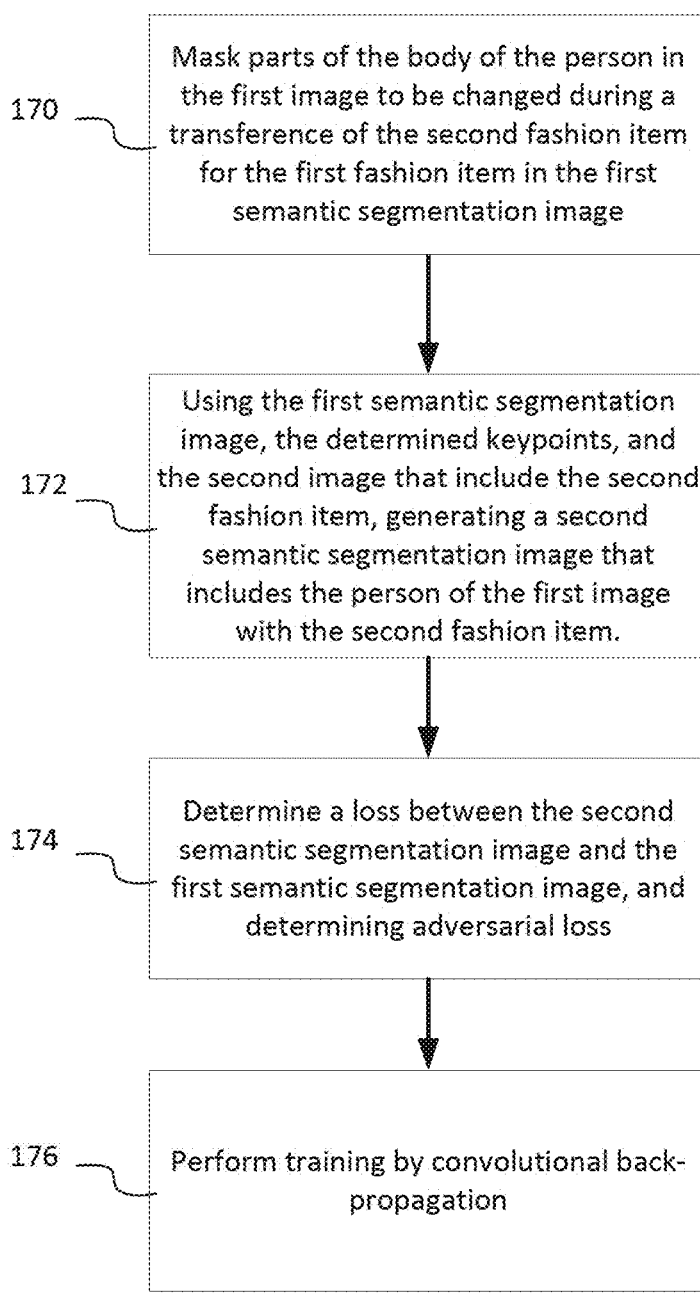
FIGS. 1B-1C show example methods of masking parts of a body of a person in an image to be changed during a transference of a fashion item, and training the masking and transference according to implementations of the disclosed subject matter.

FIG. 1B shows a method of masking of the first image to occlude pixels of the first fashion item and training the system according to an implementation of the disclosed subject matter. At operation 170, the server (e.g., central component 600 and/or second computer 700 shown in FIG. 4, and/or databases system databases 1200a-1200d shown in FIG. 5) may mask parts of the body of the person in the first image to be changed during a transference of the second fashion item for the first fashion item in the first semantic segmentation image. For example, image 220 of FIG. 2A shows masking of the image 200 that masks the shirt 222a, pants 222b, and shoes 222c, that may be replaced with a fashion item.

In some embodiments, when the parts of the body of the person in the first image overlap or self-occlude, the pixels of the overlapped or self-occluded parts in the first semantic segmentation image may be retained. For example, to generate the segmentation map for poses where hands, arms, legs, feet, or the like may overlap and/or self-occlude, the pixels associated with these portions of the body may be identified using the keypoint information. The identified pixels (e.g., of the hands or the like) may be retained in the input segmentation map, which may be used to generate a segmentation map that addresses occluding poses.

Using the first semantic segmentation image, the determined keypoints, and the second image that include the second fashion item, the server may generate a second semantic segmentation image that includes the person of the first image with the second fashion item at operation 172. The server may determine a loss between the second semantic segmentation image and the first semantic segmentation image, and determine adversarial loss, at operation 174. For example, the losses between the second semantic segmentation image and the first semantic segmentation image may be determined from the loss from cross-entropy, the semantic segmentation loss, the GAN loss, and/or the L1 loss (i.e., least absolute deviation). The determined loss may be used to train the server and/or one or more of the above-described GANs using, for example, convolutional back-propagation. In some implementations, the masking operation performed by the server (e.g., at operation 176) may be trained based on the determined losses.

Figure 1C:
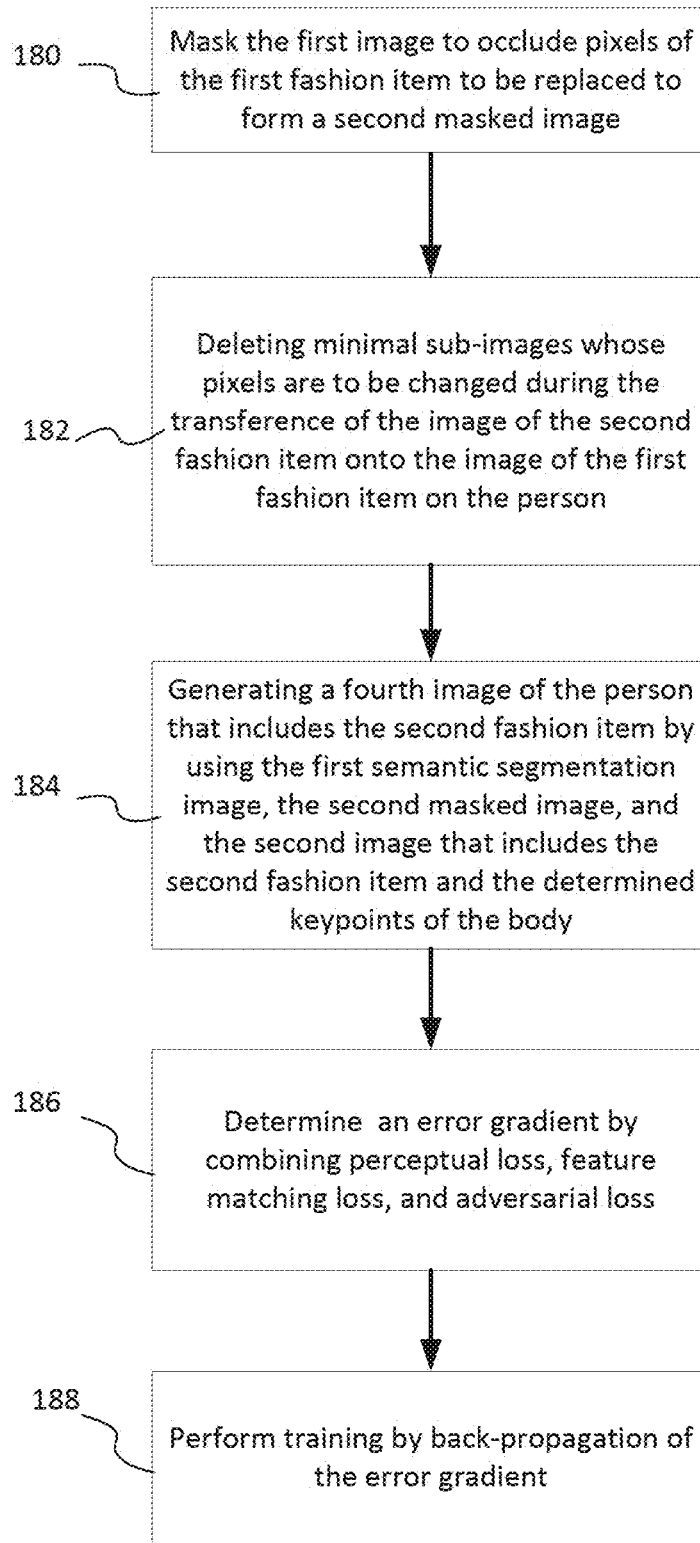

FIG. 1C shows a method of masking of the first image to occlude pixels of the first fashion item and training the system according to an implementation of the disclosed subject matter. At operation 180, the server (e.g., central component 600 and/or second computer 700 shown in FIG. 4, and/or databases system databases 1200a-1200d shown in FIG. 5) may masking, at the server, the first image to occlude pixels of the first fashion item to be replaced to form a second masked image. The occluding may be performed by the server deleting minimal sub-images whose pixels are to be changed during the transference of the image of the second fashion item onto the image of the first fashion item on the person at operation 182. The server may generate a fourth image of the person that includes the second fashion item by using the first semantic segmentation image, the second masked image, and the second image that includes the second fashion item and the determined keypoints of the body at operation 184. The server may determine an error gradient by combining perceptual loss, feature matching loss, and adversarial loss at operation 186. The server may be trained by the determined error gradient at operation 188. For example, back-propagation of the error gradient may be used to train the server.

Implementations of the presently disclosed subject matter may be implemented in and used with a variety of component and network architectures. FIG. 4 is an example computer 500 suitable for implementing implementations of the presently disclosed subject matter. As discussed in further detail herein, the computer 500 may be a single computer in a network of multiple computers. In some implementations, the computer 500 may be used to provide the first image that includes at least a portion of a person wearing a first fashion item, and/or the second image that includes a second fashion item. As shown in FIG. 4, the computer 500 may communicate with a central or distributed component 600 (e.g., server, cloud server, database, cluster, application server, neural network system, or the like). The central component 600 may communicate with one or more other computers such as the second computer 700, which may include a storage device 710. The second computer 700 may be a server, cloud server, neural network system, or the like. The storage 710 may use any suitable combination of any suitable volatile and non-volatile physical storage mediums, including, for example, hard disk drives, solid state drives, optical media, flash memory, tape drives, registers, and random access memory, or the like, or any combination thereof.

The storage 710 of the second computer 700 can store data (e.g., images of fashion items, images of a person in one or more poses, images where a fashion item has been transferred onto the person, or the like as tenant data). Further, if the systems shown in FIGS. 4-5 are multitenant systems, the storage can be organized into separate log structured merge trees for each instance of a database for a tenant. Alternatively, contents of all records on a particular server or system can be stored within a single log structured merge tree, in which case unique tenant identifiers associated with versions of records can be used to distinguish between data for each tenant as disclosed herein. More recent transactions can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The information obtained to and/or from a central component 600 can be isolated for each computer such that computer 500 cannot share information with central component 600 (e.g., for security and/or testing purposes). Alternatively, or in addition, computer 500 can communicate directly with the second computer 700.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks, as shown in FIGS. 4-5.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIGS. 4-5 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

FIG. 5 shows an example network arrangement according to an implementation of the disclosed subject matter. Four separate database systems 1200a-d at different nodes in the network represented by cloud 1202 communicate with each other through networking links 1204 and with users (not shown). In some implementations, the one or more of the database systems 1200a-d may be located in different geographic locations. Each of database systems 1200 can be operable to host multiple instances of a database, where each instance is accessible only to users associated with a particular tenant. Each of the database systems can constitute a cluster of computers along with a storage area network (not shown), load balancers and backup servers along with firewalls, other security systems, and authentication systems. Some of the instances at any of database systems 1200a-d may be live or production instances processing and committing transactions received from users and/or developers, and/or from computing elements (not shown) for receiving and providing data for storage in the instances.

One or more of the database systems 1200a-d may include at least one storage device, such as in FIG. 5. For example, the storage can include memory 570, fixed storage 530, removable media 550, and/or a storage device included with the central component 600 and/or the second computer 700. The tenant can have tenant data stored in an immutable storage of the at least one storage device associated with a tenant identifier.

In some implementations, the one or more servers shown in FIGS. 4-5 can store the data (e.g., images of fashion items, images of a person in one or more poses, images where a fashion item has been transferred onto the person, or the like) in the immutable storage of the at least one storage device (e.g., a storage device associated with central component 600, the second computer 700, and/or the database systems 1200a-1200d) using a log-structured merge tree data structure.

The systems and methods of the disclosed subject matter can be for single tenancy and/or multitenancy systems. Multitenancy systems can allow various tenants, which can be, for example, developers, users, groups of users, and/or organizations, to access their own records (e.g., tenant data and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multitenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, a log structured merge (LSM) tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "masking," "generating," "transmitting," "selecting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions.

Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for the purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
    determining, at a server that is part of a generative adversarial network (GAN), a first semantic segmentation image of a first image, wherein the first image includes at least a portion of a person wearing a first fashion item;
    determining, at the server, a plurality of keypoints of the person's body in the first image;
    using the determined first semantic segmentation image, the determined keypoints, and a second image that includes a second fashion item, generating a second semantic segmentation image at the server of the person in the first image with the second fashion item of the second image;
    masking, at the server, the first image to occlude pixels of the first fashion item that is to be replaced with the second fashion item;
    using the masked first image, the second semantic segmentation image, and the second image that includes the second fashion item, generating a third image at the server that includes the person with the second fashion item;
    transmitting, via a communications network coupled to the server, the generated third image;
    determining, at the server, a loss between the second semantic segmentation image and the first semantic segmentation image by determining a GAN loss; and
    training the GAN based on the determined loss.

2. The method of claim 1, wherein the masking of the first image to occlude pixels of the first fashion item comprises:
    deleting, at the server, minimal sub-images whose pixels are to be changed during the transference of the image of the second fashion item onto the image of the first fashion item on the person.

3. The method of claim 1, further comprising:
    masking, at the server, parts of the body of the person in the first image to be changed during a transference of the second fashion item for the first fashion item in the first semantic segmentation image.

4. The method of claim 3, wherein when the parts of the body of the person in the first image overlap or self-occlude, retaining the pixels of the overlapped or self-occluded parts in the first semantic segmentation image.

5. The method of claim 3, further comprising:
    using the first semantic segmentation image, the determined keypoints, and the second image that include the second fashion item, generating at the server a second semantic segmentation image that includes the person of the first image with the second fashion item.

6. The method of claim 5, further comprising:
    determining, at the server, adversarial loss.

7. The method of claim 6, further comprising:
    training, at the server, by convolutional back-propagation.

8. The method of claim 1, further comprising:
    masking, at the server, the first image to occlude pixels of the first fashion item to be replaced to form a second masked image.

9. The method of claim 8, wherein the occluding comprises:
    deleting, at the server, minimal sub-images whose pixels are to be changed during the transference of the image of the second fashion item onto the image of the first fashion item on the person.

10. The method of claim 8, further comprising:
    generating, at the server, a fourth image of the person that includes the second fashion item by using the first semantic segmentation image, the second masked image, and the second image that includes the second fashion item and the determined keypoints of the body.

11. The method of claim 10, further comprising:
    determining, at the server, an error gradient by combining perceptual loss, feature matching loss, and adversarial loss.

12. The method of claim 11, further comprising:
    training, at the server, by back-propagation of the error gradient.

13. A system comprising:
    a communications network;
    a server that is part of a generative adversarial network (GAN), coupled to the communications network, configured to:
        determine a first semantic segmentation image of a first image received via the communications network, wherein the first image includes at least a portion of a person wearing a first fashion item, determine a plurality of keypoints of the person's body in the first image, generate a second semantic segmentation image of the person in the first image with the second fashion item of the second image using the determined first semantic segmentation image, the determined keypoints, and a second image that includes a second fashion item, mask the first image to occlude pixels of the first fashion item that is to be replaced with the second fashion item, and generate a third image that includes the person with the second fashion item using the masked first image, the second semantic segmentation image, and the second image that includes the second fashion item,
        wherein the server transmits the generated third image via the communications network,
        wherein a loss is determined between the second semantic segmentation image and the first semantic segmentation image by determining a GAN loss, and wherein the GAN is trained based on the determined loss.

14. The system of claim 13, wherein the masking of the first image to occlude pixels of the first fashion item by the server comprises deleting minimal sub-images whose pixels are to be changed during the transference of the image of the second fashion item onto the image of the first fashion item on the person.

15. The system of claim 13, wherein the server masks parts of the body of the person in the first image to be changed during a transference of the second fashion item for the first fashion item in the first semantic segmentation image.

16. The system of claim 15, wherein when the parts of the body of the person in the first image overlap or self-occlude, the server retaining the pixels of the overlapped or self-occluded parts in the first semantic segmentation image.

17. The system of claim 15, wherein the server uses the first semantic segmentation image, the determined keypoints, and the second image that include the second fashion item, generating a second semantic segmentation image that includes the person of the first image with the second fashion item.

18. The system of claim 17, wherein the server determines adversarial loss.

19. The system of claim 18, wherein the server trains by convolutional back-propagation.

20. The system of claim 13, wherein the server masks the first image to occlude pixels of the first fashion item to be replaced to form a second masked image.

21. The system of claim 20, wherein the server performs the occluding by deleting minimal sub-images whose pixels are to be changed during the transference of the image of the second fashion item onto the image of the first fashion item on the person.

22. The system of claim 21, wherein the server generates a fourth image of the person that includes the second fashion item by using the first semantic segmentation image, the second masked image, the determined keypoints of the body, and the second image that includes the second fashion item.

23. The system of claim 22, wherein the server determines an error gradient by combining perceptual loss, feature matching loss, and adversarial loss.

24. The system of claim 23, wherein the server trains by back-propagation of the error gradient.

* * * * *